United States Patent
Feuer

(10) Patent No.: US 6,614,568 B1
(45) Date of Patent: Sep. 2, 2003

(54) WAVELENGTH-CYCLIC COMMUNICATION NETWORK AND WAVELENGTH-CYCLIC MODULES

(75) Inventor: Mark D. Feuer, Colts Neck, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/353,205

(22) Filed: Jul. 14, 1999

(51) Int. Cl.[7] .................................................. H04J 14/02
(52) U.S. Cl. ........................ 359/127; 359/130; 385/24
(58) Field of Search ................................ 359/119, 124, 359/127, 128, 130; 385/24

(56) References Cited

U.S. PATENT DOCUMENTS

| 5,721,796 | A | * | 2/1998 | de Barros et al. | ............. 385/37 |
| 6,034,799 | A | * | 3/2000 | Hansen | ............. 359/124 |
| 6,078,418 | A | * | 6/2000 | Hansen et al. | ............. 359/161 |
| 6,243,175 | B1 | * | 6/2001 | Pelekhaty | ............. 359/119 |
| 6,256,433 | B1 | * | 7/2001 | Luo et al. | ............. 385/24 |
| 6,263,126 | B1 | * | 7/2001 | Cao | ............. 385/24 |
| 6,437,888 | B1 | * | 8/2002 | Grasso et al. | ............. 359/127 |
| 6,452,703 | B1 | * | 9/2002 | Kim et al. | ............. 359/124 |
| 6,519,064 | B1 | * | 2/2003 | Fatehi et al. | ............. 359/130 |

OTHER PUBLICATIONS

B.J. Offrein, R. Germann, G.L. Bona, F. Horst, H.W.M. Salemink, "Tunable Optical Add/Drop Components in Silicon–Oxynitride Waveguide Structures," ECOC '98, Madrid, Spain, Sep. 20–24, 1998.

* cited by examiner

Primary Examiner—Brent A. Swarthout

(57) ABSTRACT

A method and apparatus for providing wavelength-cyclic communication services. M wavelength channels are provided to a plurality of add/drop modules in the network, and each of the add/drop modules selects a distinct comb of wavelength channels for provision to a subscriber. The add/drop modules select a comb of wavelength channels such that each selected channel is separated by N wavelength channels from adjacent selected channels. Thus, each add/drop module can select M/N channels for a corresponding subscriber. A passive Fabry-Perot interferometer having controlled dispersion can function as a wavelength selector at each add/drop module. The Fabry-Perot interferometer can have two different materials having different dispersion properties provided in an interference cavity, thereby providing desired tunability characteristics for the interferometer.

13 Claims, 3 Drawing Sheets

WAVELENGTH-CYCLIC COMMUNICATION NETWORK AND WAVELENGTH-CYCLIC MODULES

BACKGROUND OF THE INVENTION

1. Field of Invention

This invention relates to wavelength-cyclic communication networks and wavelength-cyclic add/drop modules.

2. Description of Related Art

Communication information can be routed between customers using various different kinds of communication networks, including optical fiber communication networks. One type of optical network uses a ring configuration to send information to and receive information from subscribers. In a ring network, nodes which route, terminate, or otherwise process signals are connected by optical communication links, such that the links form a single, closed loop. Optical ring networks may employ wavelength division multiplexing (WDM), in which a plurality of communication channels, in the form of wavelength bands, are combined into a single optical transmission medium, such as an optical fiber. Traffic on such WDM optical rings may be hubbed, in which case all wavelength channels either originate and/or terminate at a central hub node, while one or more wavelength channels are supplied to each subscriber by corresponding add/drop modules that are located at the remote nodes of the ring. Each of the add/drop modules also integrates communication information provided by a corresponding subscriber into the optical communication link so that the subscriber's communication information is returned to the hub node. For traffic which is not hubbed, a wavelength channel can originate at a first subscriber, be integrated into a communications link by a first add/drop module, be transported to a second add/drop module capable of selecting the corresponding wavelength, and be terminated by a second subscriber. More complex mesh networks can be constructed by combining rings which intersect at one or more nodes.

To provide the communication channels to a subscriber, each of the add/drop modules filter out a particular wavelength channel by either actively selecting a particular wavelength, such as by using a tunable resonant cavity device, or by passively selecting, e.g., by filtering, a specific wavelength channel. Thus, the add/drop modules are capable only of selecting a single particular wavelength channel at any given time, i.e., add/drop modules that actively select a wavelength channel can only select one channel at a time and must be re-tuned to select another channel.

Since the add/drop modules can only select a single wavelength channel at a given time, providing multiple wavelength channels to a particular subscriber either requires that an active add/drop module actively select and provide the wavelength channels for the subscriber, or that multiple passive add/drop modules be provided so that multiple channels can be selected and provided to the subscriber. Active add/drop modules are typically expensive and complex, and require continual monitoring and network management. Single-channel passive add/drop modules are simple and reliable, but adding additional passive add/drop modules to provide expanded service to a subscriber usually requires a disruption in service when the additional equipment is installed. Since each single-channel passive add/drop module weakens the optical signal (i.e. contributes optical loss to the ring), the total number of channels provided in this way is quite limited.

SUMMARY OF THE INVENTION

The invention provides a wavelength-cyclic communication network in which each add/drop module in the network is capable of selecting a distinct comb of every Nth wavelength channel for providing to a corresponding subscriber or group of subscribers. The number N can vary depending on the number of add/drop modules included in the network, or other factors such as add/drop modules that may be added to the network in the future. Thus, a first add/drop module in the network can be capable of selecting a first channel, e.g., channel J, as well as channels J+N, J+2N, J+3N, etc. A second add/drop module in the network can select channels (J+1), (J+1)+N, (J+1)+2N, etc. Optionally, the second add/drop module can select the same channels as the first add/drop module, e.g., if the subscribers using the first and second add/drop modules communicate with each other. Thus, each add/drop module has access to M/N channels, where M is the maximum number of channels provided in the network.

Since each add/drop module in the network can be configured to passively select every Nth channel for a corresponding subscriber or group of subscribers, bandwidth upgrades can be performed independently at each add/drop module without effect on any of the other add/drop modules or disruption of service at the add/drop module being upgraded. This is because the add/drop module can be constructed to provide M/N channels without necessarily requiring any additional parts, especially active tuning components. In addition, since each add/drop module provides a comb of wavelength channels that are each separated from adjacent selected channels by N−1 other channels, selection filters used to separate multiple channels in a drop fiber can have lower wavelength resolution. Accordingly, a basic implementation having only one channel per subscriber will use transmitters having a narrow band of wavelengths, thus minimizing initial component cost. For example, a ring network with 16 or fewer subscribers could begin service using only wavelengths for which components are commercially available, and reserve use of wavelengths for which components are not readily commercially available for the future.

The wavelength-cyclic add/drop modules capable of selecting a comb of every Nth wavelength channel can be constructed in various different ways, including cascades of Mach-Zehnder interferometers, back-to-back waveguide grating routers, multiple single channel add/drop modules that are connected to provide the desired wavelength selection features, or Fabry-Perot interferometers.

The invention also provides a Fabry-Perot interferometer that has a relatively simple construction, yet provides passive selection of every Nth wavelength channel, with the accurate tuning (i.e., placement of the wavelength channels) required for use in a wavelength-cyclic network.

The Fabry-Perot interferometer can be constructed in different ways to have the desired add/drop features. In one embodiment, the interferometer includes a pair of reflective surfaces that are separated by at least two portions that have different optical dispersion properties. The different dispersion properties allow desired tuning of the interferometer so that a desired set of every Nth wavelength channels is selected. The reflective surfaces can be formed from metallic films, multilayer dielectric structures or other reflective materials or material combinations. The portions of the interferometer between the two mirror surfaces can include a silica portion and an air portion that each have a desired thickness. By varying the silica and air thickness, the interferometer can be tuned to select a distinct comb of wavelength channels. The region between the mirror surfaces can also include an optional antireflection layer that is formed, for example, on a portion of a silica layer. The antireflection layer can be helpful in suppressing reflections, for example at an air-silica interface, that would otherwise complicate the wavelength response of the device. However, the antireflection layer is not required.

As another example, the Fabry-Perot interferometer can be constructed to have two or more mirrors within the Fabry-Perot cavity, i.e., multiple mirrors between two nearly parallel reflecting structures. The additional mirrors fold the light path within the device, adjusting the phase of the light at each mirror reflection and allowing full tuning of the device, i.e., the device can be constructed to select a desired set of every Nth wavelength channels. Polarization independence in the device can be achieved either by having four total angled mirrors within the interferometer cavity, or by using polarization diversity techniques. Using polarization diversity, an incoming light signal is split into two beams of orthogonal polarization, one beam is polarization rotated, both beams pass through the device in parallel and the beams are recombined at the output of the device. Devices using polarization diversity techniques to achieve polarization independence only require two mirrors or reflective surfaces within the interference cavity.

Tuning of the interferometers allows the interferometers within a single ring network to select different combs of wavelength channels, i.e., none of the add/drop modules within a same ring network will unintentionally select a same wavelength channel. Thus, a first add/drop module can be constructed to select channels J, J+N, J+2N, etc. A second add/drop module can be constructed to select channels (J+1), (J+1)+N, (J+1)+2N, etc. Accordingly, upgrading, i.e., providing additional wavelength channels, to a subscriber from a particular add/drop module can be done without disruption of service for the subscriber or any other subscribers within the ring network. This is because each add/drop module can be constructed to select every Nth wavelength channel without requiring active channel selectors or multiple single-channel selection devices, filtering devices, etc.

These and other aspects of the invention will be apparent and/or obvious from the following description.

BRIEF DESCRIPTION OF THE DRAWINGS

The invention is described in detail with regard to the following figures wherein like numerals reference like elements, and wherein.

DETAILED DESCRIPTION OF PREFERRED EMBODIMENTS

Figure 1:
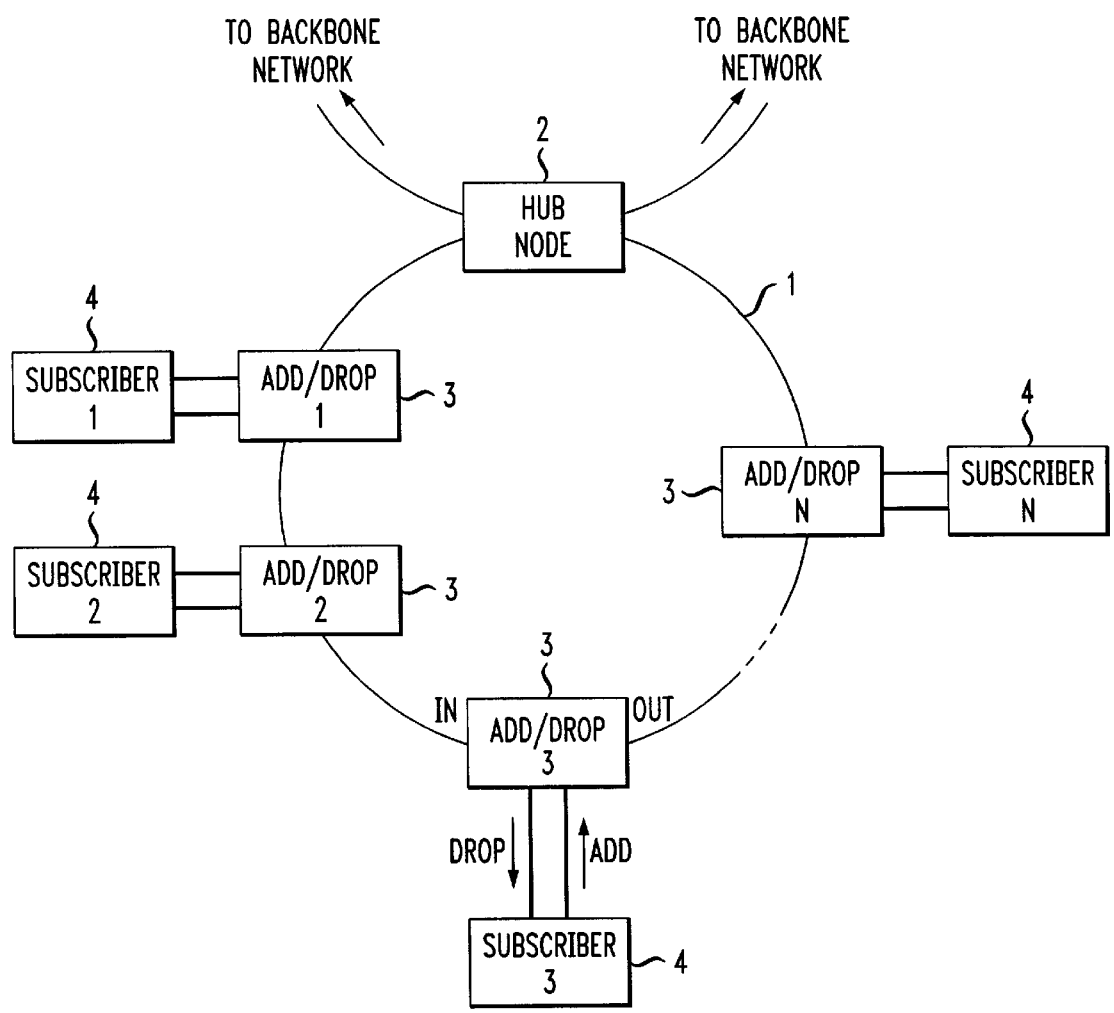
FIG. 1 is a schematic block diagram of a ring network.

FIG. 1 is a schematic block diagram of a ring network 10. The network 10 is provided with a set of wavelength channels M, a hub node 2 that communicates with a backbone network (not shown), and a set of add/drop modules 3. The total number of wavelength channels M can vary depending upon various criteria, such as a number of subscribers 4 serviced by the network 10, a maximum bandwidth of one or more components of the network 10, a total number of channels required to provide desired communication services to all subscribers 4, etc. The wavelength channels are carried by links 1, that preferably are optical fiber links. The links 1 can include various components, such as amplifiers, routing devices, or other components, to effect desired communication services.

The links 1 interconnect the hub node 2 with add/drop modules 3 positioned throughout the network 10. Each of the add/drop modules 3 selects a comb of wavelength channels and provides the wavelength channels to a corresponding subscriber 4. Since the ring network 10 in this example is a wavelength-cyclic network, the add/drop modules 3 select a comb of wavelength channels such that each of the selected wavelength channels provided to a subscriber 4 are separated by N channels from other selected wavelength channels. That is, the add/drop modules 3 each select every Nth wavelength channel used in the network 10.

For example, hubbed traffic can be provided if the add/drop module #1 selects channels J, J+N, J+2N, etc., the add/drop module #2 selects the channels (J+1), (J+1)+N, (J+1)+2N, etc. Thus, none of the add/drop modules 3 in the ring network 10 select a same wavelength channel to be provided to a corresponding subscriber 4.

Since the add/drop modules 3 can be formed to each select a distinct comb of wavelength channels for a corresponding subscriber 4, service upgrades for the subscribers 4 can be performed without any loss of service to any of the subscribers 4 in the network 10. That is, since the add/drop modules 3 can be constructed to select a distinct comb of M/N wavelength channels without requiring the addition of any extra components, a subscriber 4's service can be expanded by only adding additional components or other devices at the subscriber 4 location and possibly at the hub node 2. Thus, the service for each of the subscribers 4 can be independently upgraded without any effect on any of the other subscribers 4 in the network 10.

Each of the add/drop modules 3 has four ports, IN, OUT, DROP and ADD, as can be seen with reference to add/drop module #3 in FIG. 1. A set of wavelength channels, i.e., all M wavelength channels used in the network 10, are received at the IN port of the add/drop module 3. A wavelength channel or channels to be provided to the subscriber 4 are selected and provided via the DROP port. Wavelength channels provided to the subscriber 4 are used by the subscriber 4, e.g., the subscriber adds communication information to the channels, and are sent back to the add/drop module 3 via the ADD port. The add/drop module 3 combines the wavelength channels from the subscriber 4 to the other wavelength channels not provided to the subscriber 4 and all M channels are provided to a next add/drop module 3 via the OUT port.

Figure 2:
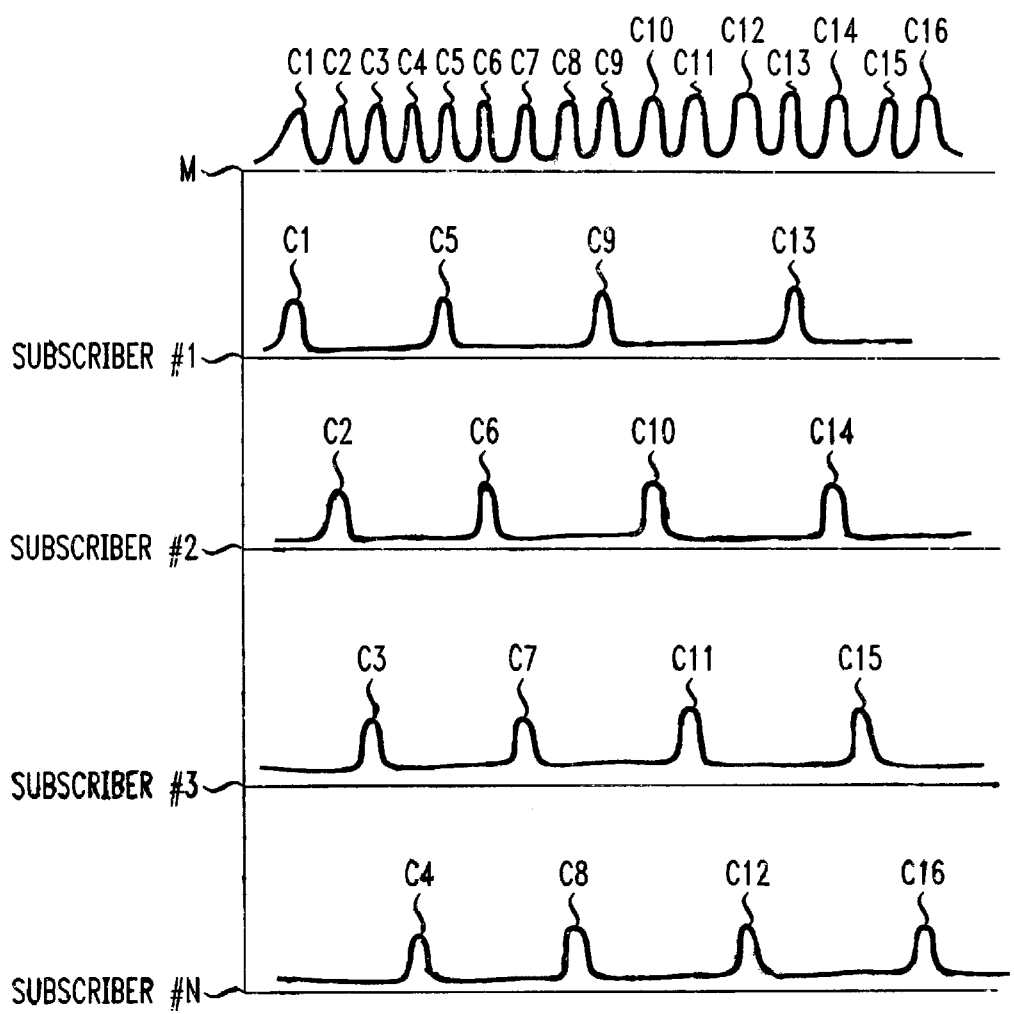
FIG. 2 is a diagram of exemplary selected wavelength combs for four different subscribers.

FIG. 2 shows a set of example wavelength channels used in the network 10 and a comb of wavelength channels provided to each of the subscribers #1–N in the network 10. In this example of hubbed traffic, the hub node 2 provides 16 total wavelength channels, i.e., M=16. Accordingly, the set of channels provided by the hub node 2 (indicated by M in FIG. 2) includes 16 individual wavelength channels C1–C16. In this example, four add/drop modules 3 are provided in the network 10, and N=4. In this example, the subscriber #1 is provided with a comb of wavelength channels that includes channels C1, C5, C9 and C13. Subscriber #2 is provided with a comb of channels C2, C6, C10 and C14; and so on.

Although in the example provided above each of the subscribers #1–N is provided with a comb of four wavelength channels, each of the subscribers 4 can be provided with a custom number of wavelength channels up to a maximum of M/N channels. For example, if each of the subscribers #1–N is to be provided with a single wavelength channel, the hub node 2 could provide only channels C5–C8 to the network 10, and thus the add/drop modules 3 would only select and provide channels C5–C8 to the subscribers #1–N, respectively. As one or more of the subscribers 4 required additional service, i.e., additional wavelength channels, the hub node 2 could add additional wavelength channels that are provided to the network 10 as necessary. For example, if the subscriber #1 requires two channels, but the subscribers #2–N only require a single channel, the hub node 2 could provide channels C5–C9 to the network 10. Thus, the subscriber #1 would be provided with channels C5 and C9 and the subscribers #2–N would be provided with channels C6–C8, respectively.

Although the above example is described only as using 16 total channels and four subscribers 4, it should be appreciated that different numbers of total wavelength channels M and subscribers 4 can be used as desired. For example, a wavelength-cyclic ring network 10 could be constructed having 16 nodes, i.e., add/drop modules 3, with a maximum of 34 channels per node and a 100 GHz spacing between channels. Although additional nodes and channels might be possible in some networks, the total number of nodes and channels at a given channel spacing is limited by the useful transparency range of components within the network 10, e.g., the useful transparency range of conventional water-free optical fibers extends from about 176 THz to 230 THz. Of course, additional channels and nodes can be included in a network 10 provided that the channels are properly spaced and information contained within each of the channels can be transmitted at a desired level of quality. Direct node-to-node (i.e., non-hubbed) traffic can be provided by arranging that a specific pair of add/drop modules 3 share at least one wavelength in common. The method of wavelength-cyclic channel add/drop can also be applied in more complex networks, such as mesh networks.

Figure 3:
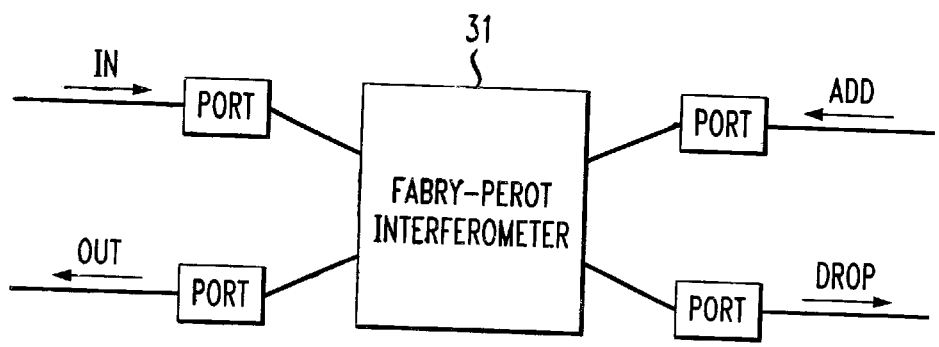
FIG. 3 is a schematic block diagram of a Fabry-Perot interferometer.

FIG. 3 shows a schematic diagram of a Fabry-Perot interferometer 31 that can also be used as an add/drop module 3. The Fabry-Perot interferometer (FPI) 31 includes IN, OUT, ADD and DROP ports. A set of wavelength channels, e.g., M wavelength channels used in a network 10, are provided at the IN port of the FPI 31. The FPI 31 passively selects a distinct comb of wavelength channels such that the selected channels are each separated by N channels from other selected channels. The selected comb of wavelength channels is provided to a subscriber 4 on the DROP port. Non-selected wavelength channels are provided at the OUT port. The FPI 31 also combines a comb of wavelength channels provided by the subscriber 4 at the ADD port to the non-selected wavelength channels at the OUT port.

An advantage of the FPI 31 shown in FIG. 3 is that a desired comb of wavelength channels can be passively selected by a single device, unlike other devices in which multiple single-channel add/drop modules are required to provide a desired comb of wavelength channels. Thus, the FPI 31 shown in FIG. 3 can provide upgraded service, e.g., additional wavelength channels, to a subscriber 4 without requiring additional components or other modifications to the FPI 31. As long as the hub node 2 provides the needed extra channels at the IN port of the FPI 31, the FPI 31 will select and provide the necessary wavelength channels to the subscriber 4.

Below, design considerations for a wavelength-cyclic FPI 31 are discussed along with details regarding the materials and dimensions of the FPI 31. For the FPI 31 to operate within a wavelength-cyclic network carrying hubbed traffic, the FPI 31 must be tuned so that it selects a unique comb of wavelength channels relative to other FPIs 31 in the network. For example, if a particular FPI 31 in a wavelength-cyclic network selects the wavelength channels J, J+N, J+2N, etc., no other FPI 31 in the network should be tuned to select the same comb of wavelength channels. Thus, the FPI 31 is preferably tuned so that the resonant frequencies for each of the FPIs 31 are appropriately spaced from each other and coincide with the wavelength channels and channel spacing provided by the hub node 2.

The resonant frequencies for a general FPI are determined by the optical phase-match condition:

$$\phi(f_k) = 2\pi k \quad (1)$$

where $\phi$ is the optical phase difference between beams that experience n and n+1 round-trip passes through an interference cavity of the interferometer, f is the optical frequency, and k is an integer representing the wavelength channel band. For a uniform, dispersion-free dielectric slab, the phase-match condition is represented by:

$$2nL\frac{f}{c}\cos\theta = k \quad (2)$$

where L is the distance between the reflection surfaces of the slab, c is the speed of light in a vacuum, and $\theta$ is the angle of incidence inside the dielectric. Thus, the optical phase difference is a linear function of f, implying a constant mode spacing at all frequencies. This constant mode spacing is called the free-spectral range (FSR) of the device. A constant FSR is convenient for tuning FPIs for a wavelength-cyclic network, but individually tuning each single dielectric slab interferometer presents a problem because changing the cavity parameters L, n, or $\theta$ changes the slope of the phase plot for the interferometer. Thus, the single slab design cannot achieve a set of interferometers with distinct frequencies while maintaining a uniform spacing among the set.

The desired characteristics for each FPI, i.e., a constant FSR that allows uniform channel spacing, suggests that a shift in the zero-frequency intercept of the phase plot for all FPIs while maintaining a constant slope for all phase plots is required. This, in turn, suggests a more general FPI that has arbitrary phase shifts $\delta 1$ and $\delta 2$ at the reflector surfaces of the FPI, such that the phase-match condition is:

$$\frac{\delta_1 + \delta_2}{2\pi} + 2\pi L \frac{f}{c}\cos\theta = k \quad (3)$$

Arbitrary phase shifts in the FPI can be introduced in various ways, including by introducing controlled dispersion into the region between the reflecting surfaces of the FPI. Adding dispersion to a uniform dieletric slab and expanding in powers of wavelength $\lambda$, the phase-match condition becomes:

$$\frac{2L\cos(\theta)}{\lambda}\sum_j n_j \lambda^j = k \quad (4)$$

Comparing this phase-match condition to the resonance frequencies needed for an ideal FPI for use in a wavelength-cyclic network defined by:

$$\frac{f}{FSR} + \frac{i}{N} = \frac{c}{FSR} \cdot \frac{1}{\lambda} + \frac{i}{N} = k \quad (5)$$

(where i identifies the node from a ring network of N nodes, and FSR is the constant free-spectral range in frequency units) shows that a uniform dielectric slab with controllable first-order dispersion and negligible higher-order dispersion can be used to construct an FPI with ideal wavelength selection characteristics. The magnitude of the required dispersion in the dielectric slab is:

$$\frac{n_1}{n_0} = \frac{i}{N} \cdot \frac{FSR}{c} \quad (6)$$

Thus, the maximum required dispersion is proportional to (N−1)/N and to FSR. For a system having 16 channels spaced at 100 GHz, the maximum dispersion is $\pm 5\times 10^{-6}$ $nm^{-1}$. For comparison, the first-order dispersion of fused silica at 1500 nm is $-8.2\times 10^{-6}$ $nm^{-1}$.

However, in practice it may prove difficult to provide the desired controlled dispersion over the necessary range in a single dielectric slab. One possible way to provide the desired amount of controlled dispersion is to introduce controlled amounts of absorbing dopants into the dielectric. A proper dopant-host combination with suitable absorption wavelengths and solubilities would need to be identified for the desired application.

There are other ways to obtain a controlled dispersion, such as using waveguide dispersion, for example, in a broad-area planar waveguide that uses off-normal incidence. However, broad-area waveguides are subject to intrinsic polarization dependence for which compensation is required.

Figure 4:
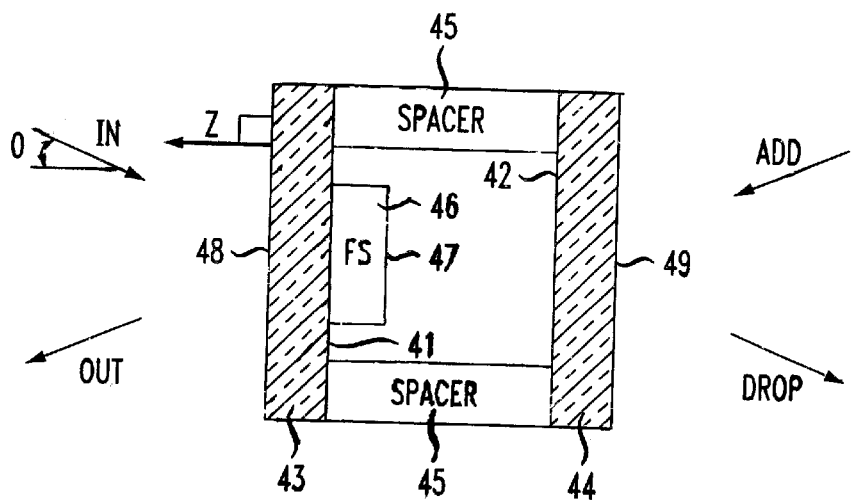
FIG. 4 shows a schematic diagram of a first Fabry-Perot interferometer.

Another way to provide controlled dispersion using conventional materials is to replace a single uniform dielectric medium with two materials that have different dispersion properties, such as that shown in FIG. 4. The FPI 31 includes two reflective surfaces 41 and 42 supported by transparent support portions 43 and 44, respectively. The two reflective surfaces 41 and 42 are maintained closely parallel to each other at a specified distance by one or more spacers 45. The region between the reflective surfaces 41 and 42, referred to as the cavity, can include a dispersion modulation portion 46. The dispersion modulation portion 46 can be fused silica or other suitable materials, and the remaining space in the cavity, called the cavity gap, can be evacuated or filled with air or other materials.

Light at the IN port of the FPI 31 strikes the FPI 31 at an angle θ with respect to a direction z perpendicular to the first reflecting surface 41. The angle θ is preferably between 0° and 10°, but can be greater than 10° if desired. Due to interference effects caused by the first and second reflecting surfaces 41 and 42, and that are modified by the optical properties of the dispersion modulation portion 46 and the cavity gap, a selected wavelength channel or comb of wavelength channels is provided at the DROP output of the FPI 31. Other non-selected wavelength channels are reflected by the FPI 31 and provided at the OUT port. Wavelength channels provided at the ADD port are passed by the FPI 31 and combined with the other non-selected wavelength channels at the OUT port. Optional anti-reflection layers (not shown) may be provided at the inner surface 47 and the outer surfaces 48 and 49, to further modify the optical properties, as understood in the art.

Using the two materials, e.g., air in the cavity gap and silica for the dispersion modulation portion 46, the FSR and the first-order dispersion within the FPI 31 cavity can be independently set by choosing the thicknesses of the materials. For the FPI 31 shown in FIG. 4 having a stratified medium, i.e., a condition where the refractive index and dispersion varies within the FPI 31 in a direction z perpendicular to the reflecting surfaces 41 and 42, the phase-match condition is:

$$\frac{\delta_1 + \delta_2}{2\pi} + 2\frac{f}{c}\int_O^L n(f,z)\cos(\theta(z))\,dz = k \quad (7)$$

In the example shown in FIG. 4, the dispersion control portion 46 is formed of fused silica, and the cavity gap contains air. Of course, other combinations of materials can be used as desired. As discussed above, anti-reflection structures can be provided at surfaces 47, 48, and 49, although the antireflection structures are not necessary. The antireflection structure can be formed from a layer of magnesium fluoride, or a combination of various different layers of different materials. The support portions 43 and 44 are preferably also made from silica, but other materials can be used as desired.

It should be noted that other wavelength-selective devices, such as Mach-Zehnder interferometers and array waveguide gratings, also have phase-match conditions analoyous to Eq. (1). Thus, they may be usefully tuned by the introduction of controlled dispersion within the optical path, in the same way as demonstrated with the FPI 31.

Table 1 shows example silica and air thicknesses for 16 different FPIs 31 for use in a wavelength-cyclic network containing 16 nodes, i.e., N=16, and that have the same basic structure as that shown in FIG. 4.

TABLE 1

| Channel # | Frequency in First Band (GHz) | Silica Thickness (μm) | Air Thickness (μm) |
| --- | --- | --- | --- |
| 0 | 192.0 | 0.00 | 93.67 |
| 1 | 192.1 | 2.29 | 89.93 |
| 2 | 192.2 | 4.96 | 86.02 |
| 3 | 192.3 | 7.60 | 82.17 |
| 4 | 192.4 | 10.33 | 78.19 |
| 5 | 192.5 | 12.88 | 74.45 |
| 6 | 192.6 | 15.51 | 70.61 |
| 7 | 192.7 | 18.14 | 66.76 |
| 8 | 192.8 | 20.78 | 62.90 |
| 9 | 192.9 | 23.42 | 59.04 |
| 10 | 193.0 | 26.06 | 55.18 |
| 11 | 193.1 | 28.70 | 51.32 |
| 12 | 193.2 | 31.35 | 47.45 |
| 13 | 193.3 | 33.99 | 43.59 |
| 14 | 193.4 | 36.63 | 39.73 |
| 15 | 193.5 | 39.27 | 35.87 |

Figure 5:
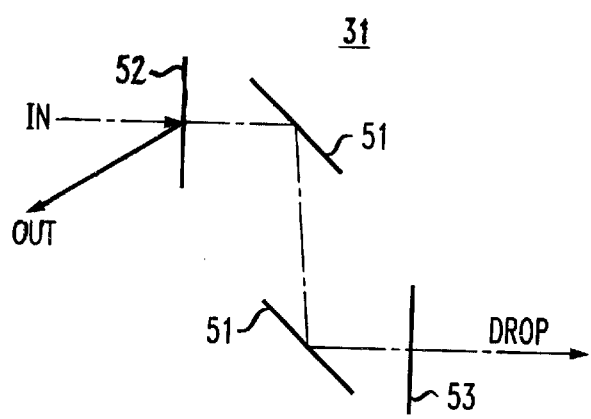
FIG. 5 is a schematic diagram of a second Fabry-Perot interferometer having a folded optical path.

Another way to provide the tuning characteristics represented in Equation 3 is to provide angled reflection surfaces within the FPI 31, for example, as shown in FIG. 5. The FPI 31 shown in FIG. 5 is shown only schematically so that the features of the FPI 31 can be easily explained. As is well known, angled reflection from a metal mirror can produce a phase-shift in the reflected light over a fairly large range. Although such angled reflection provides a fairly large range of phase-shift, the phase-shift does not quite cover the π radians, so angle-tuning of a simple two-mirror FPI cannot cover the entire frequency range needed for an FPI used in a wavelength-cyclic network. However, full tuning can be achieved if extra mirrors 51 are provided between the first and second mirror surfaces 52 and 53 of the FPI 31 to obtain a folded-cavity FPI. Since there are four angled reflections in a round trip for light within the FPI 31, a phase adjustment range of $\pi/2$ radians per reflection is adequate for full tuning. Although the mirrors 51 can be metal mirrors, the internal reflections within the FPI 31 can be obtained by total internal reflection at dielectric interfaces or by other reflecting surfaces within the FPI 31. In addition, FIG. 5 only shows a simple two-dimensional folded light path, but three-dimensional beam paths and individually adjusted mirror 51 angles are also possible.

FPIs 31 that use angled reflection can be complicated by a strong polarization dependence because the reflection phase-shift for an s-polarized wave can be quite different from that of a p-polarized wave. Polarization independence for the FPI 31 can be achieved in two possible ways. The optical path can be polarization balanced by adding another pair of angled mirrors 51 that are rotated 90° around the optical axis relative to the mirror 51. With this configuration, each reflection as an s-wave is summed with a reflection as a p-wave, and the total path is polarization independent.

Another alternative, which is well known and used for optical isolators and circulators, is polarization diversity. Using polarization diversity techniques, an incoming signal is split into two beams of orthogonal polarization, one beam is polarization rotated, and both beams pass through the device in parallel. Upon being output by the FPI 31, the two parallel beams are recombined at an output port.

While the invention has been described in conjunction with specific embodiments, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A wavelength-cyclic communications network, comprising:

M wavelength channels;

a plurality of nodes comprising add/drop modules, each add/drop module selecting a distinct comb of wavelength channels such that each selected wavelength channel in the comb is separated by N wavelength channels from at least one adjacent wavelength channel; wherein at least one add/drop modules comprises a Fabry-Perot interferometer that contains at least two materials having different dispersion properties within an interference cavity; wherein the two materials having different dispersion properties are fused silica and air, wherein the thicknesses of the silica and air portions in a direction perpendicular to reflecting surfaces of at least two Fabry-Perot interferometer in at least two add/drop modules are different, and communication links for transmitting the wavelength channels between the plurality of nodes.

2. The network of claim 1, wherein the nodes and links are arranged to form a ring network.

3. The network of claim 1, further comprising one or more hub nodes that provide the M wavelength channels.

4. The network of claim 1, wherein at least one add/drop module comprises a passive wavelength channel selecting device.

5. The network of claim 1, wherein at least one add/drop module comprises an active wavelength channel selection device.

6. The network of claim 1, wherein at least one add/drop module comprises a plurality of single-channel add/drop modules.

7. The network of claim 1, wherein the wavelength channels are equally spaced in one of wavelength and frequency relative to each other.

8. The network of claim 1, wherein at least one add/drop module comprises an interferometric device that operates to select a comb of wavelength channels using controlled dispersion within its optical path.

9. The network of claim 1, wherein at least one add/drop module comprises a Fabry-Perot interferometer that operates to select a comb of wavelength channels using controlled dispersion within an interference cavity.

10. A method for providing communication services, comprising:

providing M communication channels to a plurality of add/drop modules in a network;

selecting a distinct comb of wavelength channels at each add/drop module in the network such that selected wavelength channels at each add/drop modules are separated by N wavelength channels from other selected wavelength channels at the add/drop module, wherein the step of selecting a distinct comb of wavelength channels comprises providing a Fabry-Perot interferometer having two different materials having different dispersion properties in an interference cavity at each add/drop module where the thicknesses of the two materials in a direction perpendicular to reflecting surfaces in the interferometers are all different from each other; and providing the selected wavelength channels at each add/drop module to at least one subscriber.

11. The method of claim 10, wherein the step of providing M wavelength channels comprises providing M wavelength channels that are all equally spaced in one of wavelength and frequency from each other.

12. The method of claim 10, where in the step of selecting a distinct comb of wavelength channels comprises actively controlling at least one wavelength selection device.

13. The method of claim 10, where in the step of selecting a distinct comb of wavelength channels comprises passively selecting desired wavelength channels.

* * * * *